United States Patent [19]

Senckowski

[11] Patent Number: 4,927,668

[45] Date of Patent: May 22, 1990

[54] TREATMENT FOR AUTOMOBILE WINDSHIELDS

[75] Inventor: Patrick D. Senckowski, 114 Southbridge St., Worcester, Mass. 01608

[73] Assignees: Joseph M. Senckowski; Patrick D. Senckowski, both of Worcester, Mass.

[21] Appl. No.: 226,617

[22] Filed: Aug. 1, 1988

[51] Int. Cl.$^5$ .............................................. B05D 5/06
[52] U.S. Cl. ................................. 427/168; 427/165; 427/389.7; 106/13; 428/447; 65/60.3
[58] Field of Search .................. 427/168, 165, 389.7; 106/13; 428/447; 65/60.3

[56] References Cited

U.S. PATENT DOCUMENTS

| | | | |
|---|---|---|---|
| 2,877,201 | 3/1959 | Bonza et al. | 260/33.6 |
| 2,962,390 | 11/1960 | Fain et al. | 117/64 |
| 3,579,540 | 5/1971 | Ohlausen | 260/33.4 |
| 3,766,123 | 10/1973 | Burnie et al. | 260/32.4 |
| 3,795,535 | 5/1974 | Boller | 117/118 |
| 3,972,850 | 8/1976 | Hamilton et al. | 260/37 |
| 3,998,643 | 12/1976 | Liddle | 106/2 |
| 4,080,476 | 3/1978 | Laskey | 428/413 |
| 4,098,840 | 7/1978 | Yoshida et al. | 260/827 |
| 4,159,222 | 6/1979 | Lebow et al. | 156/632 |
| 4,478,909 | 10/1984 | Taniguchi et al. | 428/331 |
| 4,540,634 | 9/1985 | Ashlock et al. | 428/451 |
| 4,548,842 | 10/1985 | Pohl | 427/407 |
| 4,565,714 | 1/1986 | Koshar | 427/54.1 |
| 4,609,688 | 9/1986 | Rädisch et al. | 523/169 |
| 4,624,900 | 11/1986 | Fau | 428/447 |
| 4,847,160 | 7/1989 | Munz et al. | 428/447 |

*Primary Examiner*—Michael Lusignan
*Assistant Examiner*—Roy V. King
*Attorney, Agent, or Firm*—Norman S. Blodgett; Gerry A. Blodgett

[57] ABSTRACT

An anti-fogging and anti-wetting composition for coating at least one surface of an optically clear substrate, in particular, an automobile windshield, and comprising an isoparaffinic hydrocarbon solvent, an alkane selected from the group consisting of isobutane, N-butane, and propane, a hydrocarbon wax, and water. A process for treating the surface of an optically clear substrate with an anti-fogging and anti-wetting composition, which is applied from a pressurized container in aerosol form, to provide a transparent layer of wax on the surface of the substrate.

4 Claims, No Drawings

TREATMENT FOR AUTOMOBILE WINDSHIELDS

BACKGROUND OF THE INVENTION

1. Field of the Invention:

The present invention generally relates to a compound for treating the surface of an optically clear substrate, and more particularly, to a compound, which, when applied to the surface of an automobile windshield or window, will facilitate cleaning and then provide a transparent anti-fogging and anti-wetting coating onto the surface.

2 Setting for the Invention:

The occurrence of impaired visibility through an automobile windshield during inclement weather conditions has posed a persistent danger to automobile drivers. The impaired visibility frequently occurs when either fog spots or water deposit on the surface of the windshield, and of which are not effectively removed by a windshield wiper. The fog spots generally occur during weather conditions of high temperature and high humidity, and deposit when there is a difference between the surface temperature of the windshield and the surrounding atmospheric conditions. A light rain will reduce transparency as the mist of the rain deposits on the surface of the windshield. Adverse effects are also noted where foreign particulate accumulates on the windshield surface and impedes visibility by causing water to spot around the particulate matter.

A number of prior art references have described compositions for providing water-repellant coatings on various substrates; however, it is believed that the instant composition and the means of its application are novel so as to provide an anti-fogging and anti-wetting coating on the surface of an automobile windshield or window.

OBJECTIVE OF THE INVENTION

Accordingly, it is a primary object of the invention to provide a compound for coating the surface of an optically clear substrate to impart an anti-fogging and anti-wetting coating thereon.

It is another object of the invention to provide an anti-fogging and anti-wetting compound having a solvent component which will facilitate cleaning of the surface of an optically clear substrate, so that the surface can be coated with a uniform layer of the compound's wax component.

Another object of the invention to provide an anti-fogging and anti-wetting compound that is adapted to be packaged in a pressurized container to enable application of the compound in the form of an aerosol mist.

Another object of the invention is to provide an anti-fogging and anti-wetting compound for application to the surface of an automobile windshield, which is safe to use, stable in storage, requires no special surface preparation, and is easy to apply.

Still another object of the invention is to provide an anti-fogging and anti-wetting compound for application to the surface(s) of a window.

With these and other objects in view, as will apparent to those skilled in the art, the invention resides in the combination of elements set forth in the specification and covered by the claims appended hereto.

SUMMARY OF THE INVENTION

In accordance with the present invention, there is described a compound having a composition which facilitates cleaning of and provides a transparent layer of an anti-wetting and anti-fogging coating onto the surface of an automobile windshield or window. The composition comprises a mixture, which is formulated to be applied to the surface of an automobile windshield as an aerosol mist, from a pressurized container and comprises:

(a) 10 to 20% by weight of an isoparaffinic hydrocarbon solvent,
(b) 10 to 20% by weight of an alkane selected from the group consisting of isobutane, N-butane, and propane,
(c) 5 to 15% by weight of a hydrocarbon wax, and
(d) 60 to 70% by weight of water.

DESCRIPTION OF PREFERRED EMBODIMENT

The present invention contemplates an automobile windshield having a surface which is coated with a layer of an anti-fogging and anti-wetting composition.

The preferred formulation of the coating comprises:

(a) 10 to 20% by weight of an isoparaffinic hydrocarbon solvent,
(b) 10 to 20% by weight of an alkane selected from the group consisting of isobutane, N-butane, and propane,
(c) 5 to 15% by weight of a hydrocarbon wax, and
(d) 60 to 70% by weight of water.

The preferred formulation includes an alkane propellant to enable the compound to be applied to the surface to an optically clear substrate in aerosol form, from a pressurized container. It is anticipated that an alternative means of application of the compound may be desired, for example, in the form of a liquid, dispensed from a standard container. Administration of the compound in liquid form would eliminate the need for the alkane component of the formulation.

The coating composition of the present invention is prepared in accordance with techniques which are known to those skilled in the art. It is noted, however, that the particular hydrocarbon wax component selected for the compound would effect the production technique in view its solubility, melting point and other chemical properties of the component, as determined by the structure and number of carbon atoms. It is noted that the use of combination hydrocarbon-silicone component in the coating composition would enhance the durability of the anti-fogging and anti-wetting layer.

Although there are many hydrocarbon wax and/or hydrocarbon-silicone based constituents which may be incorporated into the preferred composition of the compound, one formulation which has been found to be ideal in effectuating the objective of the invention, is sold under the trademark "PLEDGE" by S.C. Johnson & Son, Inc. of Racine, Wis.

The compound, when applied as a coating to an automobile windshield or window, provides improved visibility through the windshield during rain storms and other atmospheric conditions, and thus insuring greater safety for the driver and passengers. The application of the compound to the surface of automobile windshields in the winter months, in locations where overnight frost deposits on the windshield, enables the frost to be removed more easily than where the windshield is untreated.

The process of applying the compound exemplefies the utility of the composition for its claimed use. The compound is ideally applied to the surface of the automobile windshield in the form of an aerosol mist, from a pressurized container. The isoparaffinic hydrocarbon solvent component of the compound facilitates the cleaning of the windshield surface, in part, because of the component's interaction with surface bound particulate and oils deposited on the surface. The surface of the windshield is then buffed with a terry-type cloth or an acceptable substitute, for the purpose of removing the particulate matter and oils, and to uniformly disperse the wax component over the surface of the windshield. Excess compound deposited on the surface is also removed by buffing. The remaining solvent component of the compound will evaporate and cause the wax component to precipitate, and thereby form a layer of coating over the surface of the windshield.

The compound may be re-applied when the anti-fogging and anti-wetting properties of the coating dissipate. Another advantage of the formulation of the compound enables one to administer the compound, if desired, with regular frequency. The solvent component of the compound facilitates removal of a pre-administered layer of coating on the surface of the windshield.

It is obvious that minor changes may be made in the form and composition of the invention without departing from the material spirit thereof. It is not, however, desired to confine the invention to the exact form herein shown and described, but it is desired to include all such forms as properly come within the scope claimed.

The invention having thus been described, what is claimed as new and desired to secure by Letters Patent is:

1. The process of applying onto at least one surface of an optically clear substrate a compound which forms a transparent anti-fogging and anti-wetting layer from a valve actuated, pressurized container comprising the following steps:
    (a) actuating the valve,
    (b) directing the compound onto the surface of an optically clear substrate, and wherein said compound comprises:
        (1) 10 to 20% by weight of an isoparaffinic hydrocarbon solvent,
        (2) 10 to 20% by weight of an alkane selected from the group consisting of isobutane, N butane, and propane,
        (3) 5 to 15% by weight of a hydrocarbon wax, and
        (4) 60 to 70% by weight of water, and
    (c) buffing the substrate with a terry-type cloth to remove dirt and oils from the substrate and to provide a uniform and transparent layer of the compound on said surface.

2. The process as recited in claim 1, wherein said alkane is a propellant.

3. The process as recited in claim 1, wherein said solvent dissolves said wax into the compound solution to enable application of the compound onto the surface of an optically clear substrate, and where, upon evaporation of the solvent, said wax precipitates to form a layer on said surface, and wherein said solvent facilitates removal of dirt and oil from said surface.

4. The process as recited in claim 1 wherein said compound is manufactured under the trademark PLEDGE by S.C. Johnson & Son, Inc. of Racine Wisconsin.

* * * * *